(12) United States Patent  
Strandell

(10) Patent No.: US 9,343,034 B2  
(45) Date of Patent: May 17, 2016

(54) USER INTERFACE, DEVICE AND METHOD FOR DISPLAYING A STABLE SCREEN VIEW

(75) Inventor: Toni Strandell, Helsinki (FI)

(73) Assignee: Nokia Technologies Oy, Espoo (FI)

(*) Notice: Subject to any disclaimer, the term of this patent is extended or adjusted under 35 U.S.C. 154(b) by 1549 days.

(21) Appl. No.: 12/135,166

(22) Filed: Jun. 7, 2008

(65) Prior Publication Data

US 2009/0307634 A1 Dec. 10, 2009

(51) Int. Cl.
*G09G 5/00* (2006.01)
*H04M 1/725* (2006.01)

(52) U.S. Cl.
CPC .......... *G09G 5/00* (2013.01); *G06F 2200/1637* (2013.01); *G09G 2340/0492* (2013.01); *H04M 1/72544* (2013.01); *H04M 2250/12* (2013.01)

(58) Field of Classification Search
USPC ......................................... 715/863, 864, 865
See application file for complete search history.

(56) References Cited

U.S. PATENT DOCUMENTS

| | | | |
|---|---|---|---|
| 6,256,033 B1* | 7/2001 | Nguyen | 715/863 |
| 6,567,101 B1 | 5/2003 | Thomas | |
| 7,305,631 B1* | 12/2007 | Bort | 715/864 |
| 2003/0085870 A1 | 5/2003 | Hinckley et al. | |
| 2004/0176166 A1* | 9/2004 | Siegel | 463/37 |
| 2007/0290999 A1* | 12/2007 | Cho et al. | 345/158 |
| 2008/0115091 A1* | 5/2008 | Jung et al. | 715/867 |

FOREIGN PATENT DOCUMENTS

| | | |
|---|---|---|
| EP | 1 814 019 A2 | 1/2007 |
| EP | 1626292 A2 | 1/2007 |
| JP | 6004208 A | 1/1994 |
| JP | 7036421 A | 2/1995 |
| TW | 2004 16665 A | 9/2004 |
| TW | 2004 28224 A | 12/2004 |
| WO | 2006 095573 A1 | 9/2006 |

OTHER PUBLICATIONS

Written Opinion of the International Searching Authority Dated Sep. 24, 2009.
Office Action for Taiwanese Application No. 98118912 dated Jun. 19, 2014.
International Search Report for Application No. PCT/FI2009/050456 dated Sep. 24, 2009.
Office Action frror Taiwanese Application No. 98118912 dated Nov. 12, 2015.

* cited by examiner

*Primary Examiner* — Thanh Vu
(74) *Attorney, Agent, or Firm* — Alston & Bird LLP

(57) ABSTRACT

A user interface configured to display a screen view representing an application and to receive motion data representing a detected movement, said user interface being further configured to update said displayed screen view to visually counteract said detected movement.

20 Claims, 5 Drawing Sheets

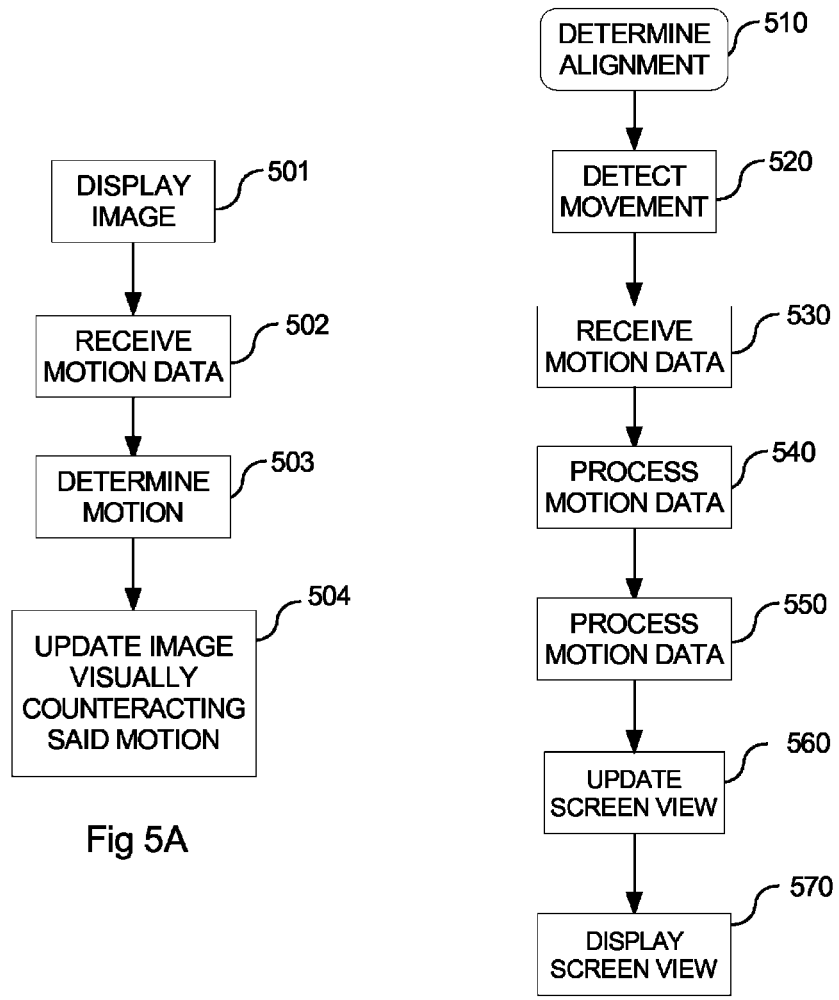

USER INTERFACE, DEVICE AND METHOD FOR DISPLAYING A STABLE SCREEN VIEW

FIELD

The present application relates to a device and a method for operating modes, and in particular to a device and a method for switching operating modes.

BACKGROUND

More and more electronic devices such as mobile phones, MP3 players, Personal Digital Assistants (PDAs) are becoming smaller and smaller while having more and more information stored and/or accessible through them. Users are relying on these devices and becoming all the more dependent on them. Due to this they are designed to be small and easy to carry around. Many such devices offer video games for a user to enjoy.

It is common for users playing such games to move his body according to the actions taken in the game. For example if the user is playing a race car game he has a tendency to lean in the way the (virtual) car is turning and also to turn the handset or controller in that way as he instructs the game to turn the car.

This leads to a warped perception of the virtual world being displayed for the game which can become confusing to a user and in some cases lead to motion sickness. Also prolonged gaming sessions may temporarily affect a user's perception of real life making it difficult for a user to navigate his body correctly.

A device that allows for prolonged gaming experiences without any ill effects would thus be useful in modern day society.

SUMMARY

On this background, it would be advantageous to provide a device and a method that overcomes or at least reduces the drawbacks indicated above by providing a user interface configured to update a screen image according to detected movement so as to visually counteract said movement This provides an intuitive way of maintaining a displayed screen view stable in relation to the surroundings of a device incorporating said user interface regardless of movements of the device.

The disclosed embodiments provide a user interface configured to display a screen view representing an application and to receive motion data representing a detected movement, said user interface being further configured to update said displayed screen view to visually counteract said detected movement.

This allows a user interface to maintain a stable screen view with regards to the surroundings of a device incorporating said user interface.

In one embodiment the user interface is further configured to determine a virtual horizontal alignment for said displayed screen view and to update said virtual horizontal alignment according to said detected movement.

This allows the screen view to be updated correctly and to be aligned with a real-world horizon.

In one embodiment the visually counteraction is achieved by said user interface being configured to determine a virtual movement being the opposite of said detected movement and subjecting said displayed screen view to said virtual movement.

This negates the effect on the displayed screen view of the movement a device incorporating said user interface is subjected to.

In one embodiment the user interface is further configured to generate control instructions according to said received motion data and to control said application according to said determined control data.

This allows for a movement based user interface that still maintains a stable screen view to be implemented in one single unitary device.

In one embodiment the user interface is further configured to determine said virtual horizontal alignment according to a screen view representing said application upon startup of said application.

This allows for a fast and computational efficient way of determine a status quo for the displayed screen view.

In one embodiment the user interface is further configured to determine said virtual horizontal alignment according to graphical objects in said screen view using image processing methods.

This allows for a precise and flexible way of determining a status quo for a displayed screen image which can also be aligned with real-world objects according to graphical objects comprised in said screen view.

The aspects of the disclosed embodiments are also directed to providing a device incorporating and implementing or configured to incorporate and implement a user interface according to above.

In one embodiment the device is a mobile communication terminal, a game console, a media player or a personal digital assistant.

Such a device has the same advantages of the user interface above.

The aspects of the disclosed embodiments are also directed to providing a user interface comprising means for displaying a screen view representing an application, means for detecting a movement and generating motion data representing said detected movement, said user interface further comprising means for updating said displayed screen view according to said motion data so as to visually counteract said detected movement.

The aspects of the disclosed embodiments are also directed to providing a computer readable medium including at least computer program code for controlling a user interface, said computer readable medium comprising software code for controlling a user interface, said computer readable medium comprising: software code for displaying a screen view representing an application, software code for receiving motion data, and software code for updating said displayed screen view according to said received motion data so as to visually counter act said detected movement.

The aspects of the disclosed embodiments are also directed to providing a device incorporating and implementing a computer readable medium according to above.

The aspects of the disclosed embodiments are also directed to providing a method for updating a displayed screen view representing an application on a device comprising receiving motion data representing a detected movement of said device, update said screen view according to said received motion data so as to visually counteract said detected movement.

This method and the embodiments below have the same advantages as are outlined above.

In one embodiment the method further comprises subjecting said screen view to a virtual movement being opposite to said detected movement.

In one embodiment the method further comprises generating control data according to said received motion data and to control said application according to said control data.

The aspects of the disclosed embodiments are also directed to providing a device incorporating and implementing or configured to incorporate and implement a method according to above.

Further objects, features, advantages and properties of device, method and computer readable medium according to the present application will become apparent from the detailed description.

BRIEF DESCRIPTION OF THE DRAWINGS

In the following detailed portion of the present description, the teachings of the present application will be explained in more detail with reference to the example embodiments shown in the drawings, in which:

FIGS. 5A and 5B are flow charts describing each a method according to an embodiment, and FIGS. 6A and B are plane views of a device according to an embodiment.

DETAILED DESCRIPTION

In the following detailed description, the device, the method and the software product according to the teachings for this application in the form of a cellular/mobile phone will be described by the embodiments. It should be noted that although only a mobile phone is described the teachings of this application can also be used in any electronic device such as laptops, PDAs, mobile communication terminals, electronic books and notepads and other electronic devices offering access to information.

Figure 1:
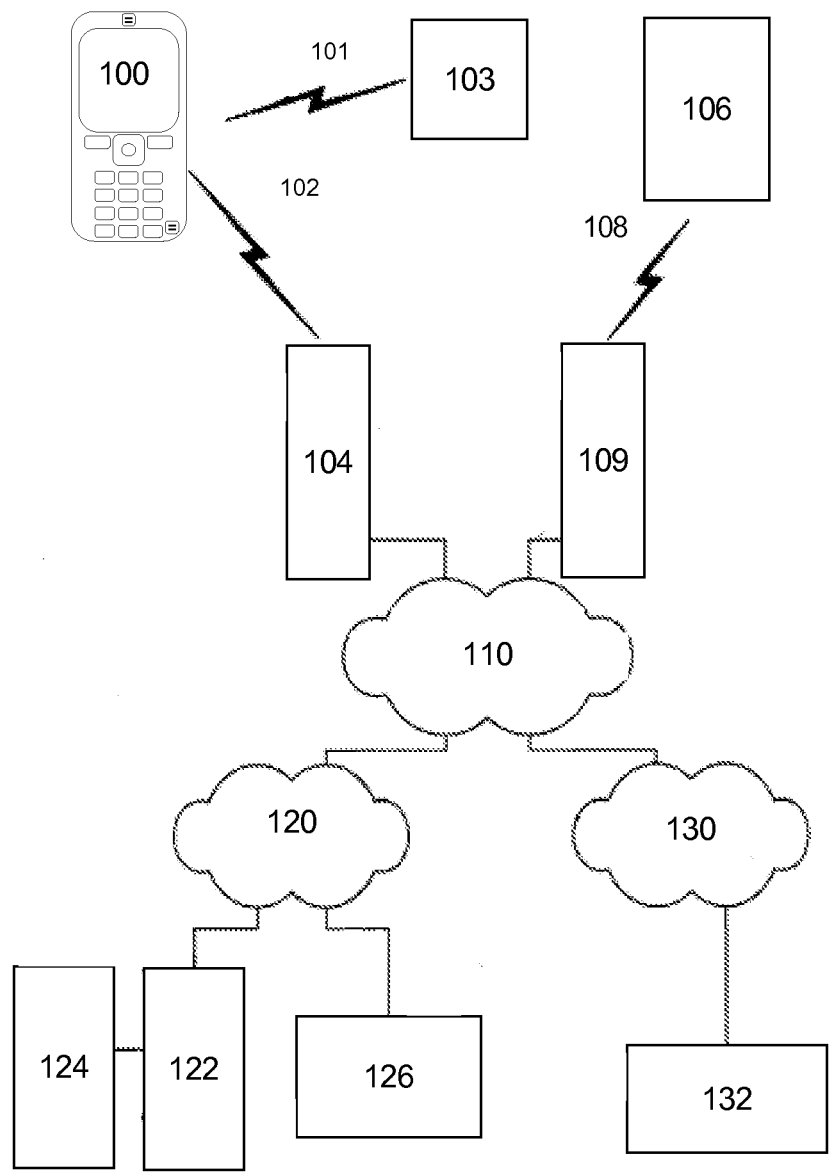
FIG. 1 is an overview of a telecommunications system in which a device according to the present application is used according to an embodiment.

FIG. 1 illustrates an example of a cellular telecommunications system in which the teachings of the present application may be applied. In the telecommunication system of FIG. 1, various telecommunications services such as cellular voice calls, www/wap browsing, cellular video calls, data calls, facsimile transmissions, music transmissions, still image transmissions, video transmissions, electronic message transmissions and electronic commerce may be performed between a mobile terminal 100 according to the teachings of the present application and other devices, such as another mobile terminal 106 or a stationary telephone 132. It is to be noted that for different embodiments of the mobile terminal 100 and in different situations, different ones of the telecommunications services referred to above may or may not be available; the teachings of the present application are not limited to any particular set of services in this respect.

The mobile terminals 100, 106 are connected to a mobile telecommunications network 110 through RF links 102, 108 via base stations 104, 109. The mobile telecommunications network 110 may be in compliance with any commercially available mobile telecommunications standard, such as GSM, UMTS, D-AMPS, CDMA2000, FOMA and TD-SCDMA.

The mobile telecommunications network 110 is operatively connected to a wide area network 120, which may be Internet or a part thereof. An Internet server 122 has a data storage 124 and is connected to the wide area network 120, as is an Internet client computer 126. The server 122 may host a www/wap server capable of serving www/wap content to the mobile terminal 100.

A public switched telephone network (PSTN) 130 is connected to the mobile telecommunications network 110 in a familiar manner. Various telephone terminals, including the stationary telephone 132, are connected to the PSTN 130.

The mobile terminal 100 is also capable of communicating locally via a local link 101 to one or more local devices 103. The local link can be any type of link with a limited range, such as Bluetooth, a Universal Serial Bus (USB) link, a Wireless Universal Serial Bus (WUSB) link, an IEEE 802.11 wireless local area network link, an RS-232 serial link, etc. The local devices 103 can for example be various sensors that can communicate measurement values to the mobile terminal 100 over the local link 101.

Figure 2:
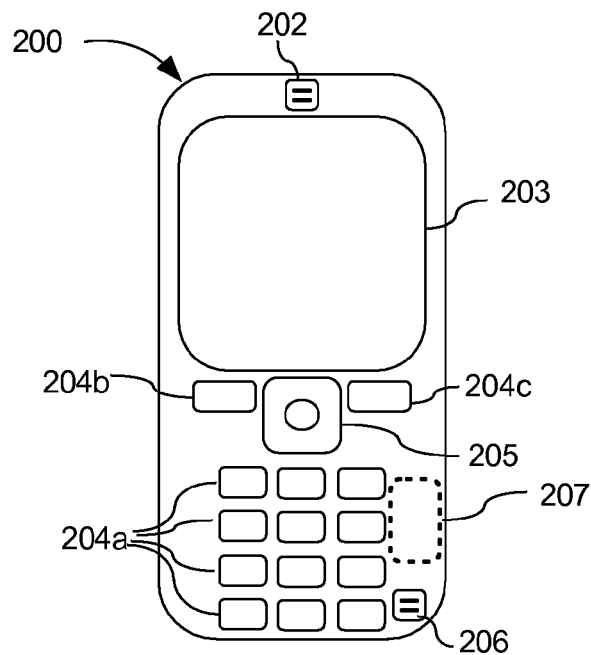
FIG. 2 is a plane front view of a device according to an embodiment.

An embodiment 200 of the mobile terminal 100 is illustrated in more detail in FIG. 2. The mobile terminal 200 comprises a speaker or earphone 202, a microphone 206, a main or first display 203 and a set of keys 204 which may include a keypad 204a of common ITU-T type (alpha-numerical keypad representing characters "0"-"9", "*" and "#") and certain other keys such as soft keys 204b, 204c and a joystick 205 or other type of navigational input device. The device is also equipped with a motion sensor 207. In this embodiment the motion sensor is an accelerometer. Motion sensors can also be implemented with gyroscopes, piezo crystals and other movement sensors as are known. In FIG. 2 the motion detector 207 is shown with dashed lines as it is part of a device's internal components and not necessarily visible from the outside.

Figure 3:
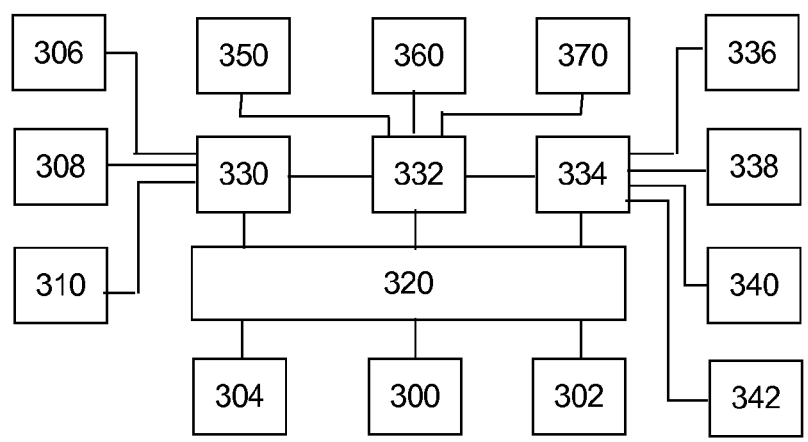
FIG. 3 is a block diagram illustrating the general architecture of a device of FIG. 2 in accordance with the present application, FIGS. 4A and B are plane views of a device according to an embodiment.

The internal component, software and protocol structure of the mobile terminal 200 will now be described with reference to FIG. 3. The mobile terminal has a controller 300 which is responsible for the overall operation of the mobile terminal and may be implemented by any commercially available CPU ("Central Processing Unit"), DSP ("Digital Signal Processor") or any other electronic programmable logic device. The controller 300 has associated electronic memory 302 such as RAM memory, ROM memory, EEPROM memory, flash memory, or any combination thereof. The memory 302 is used for various purposes by the controller 300, one of them being for storing data used by and program instructions for various software in the mobile terminal. The software includes a real-time operating system 320, drivers for a man-machine interface (MMI) 334, such as for a motion detector 342, an application handler 332 as well as various applications. The applications can include a video game 350, a calendar application 360, as well as various other applications 370, such as applications for voice calling, video calling, sending and receiving Short Message Service (SMS) messages, Multimedia Message Service (MMS) messages or email, web browsing, an instant messaging application, a phone book application, a notepad application, a control panel application, a camera application, a text editor application etc. It should be noted that two or more of the applications listed above may be executed as the same application The MMI 334 also includes one or more hardware controllers, which together with the MMI drivers cooperate with the first display 336/203, and the keypad 338/204 as well as various other Input/output devices such as a motion detector, a microphone, a speaker, a vibrator, a ringtone generator, a light emitting diode, LED, indicator, etc. As is commonly known, the user may operate the mobile terminal through the man-machine interface thus formed.

The software also includes various modules, protocol stacks, drivers, etc., which are commonly designated as 330 and which provide communication services (such as transport, network and connectivity) for a Radio Frequency interface 306, and optionally a Bluetooth interface 308 and/or an IrDA interface 310 for local connectivity. The RF interface 306 comprises an internal or external antenna as well as appropriate radio circuitry for establishing and maintaining a wireless link to a base station (e.g. the link 102 and base station 104 in FIG. 1). As is well known to a man skilled in the art, the radio circuitry comprises a series of analogue and digital electronic components, together forming a radio receiver and transmitter. These components include, band pass filters, amplifiers, mixers, local oscillators, low pass filters, AD/DA converters, etc.

Figure 4A:
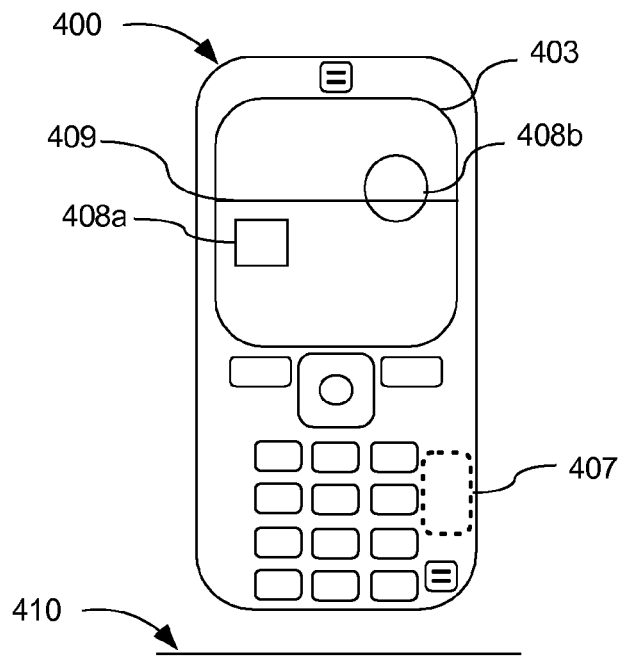
Figure 4A:
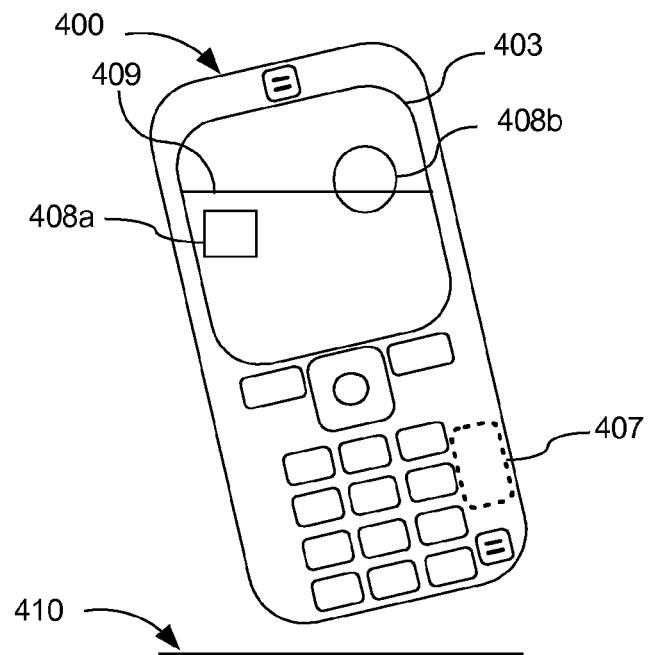

FIG. 4A shows a device 400 with a screen view of an application according to the teachings herein. FIG. 4 is a schematic view of a screen view for an application (350). The device 400 is, in this exemplary embodiment, a mobile phone such as is described with reference to FIG. 2. In the screen view there are a number of graphical objects 408a and 408b and a virtual horizon 409 that is parallel with the real world horizon, indicated in this figure as horizontal line 410.

As the device is moved or turned the motion sensor (207) generates motion data accordingly which motion data is received by the controller 300. The controller 300 updates the screen view accordingly and displays it on the display 403, see FIG. 4B. The screen view is updated so that the virtual horizon 409 is maintained parallel with the real-world horizon 410. As can be seen the distance in between and location of the graphical objects 408 displayed on the display in relation to each other are maintained.

The motion data received represents a detected movement that the device or user interface has been subjected to. The controller determines this detected movement and assigns a virtual movement to the screen view, which virtual movement is the opposite of the detected movement. This causes the updated screen view to visually counteract the detected movement and the displayed screen view will appear to be stable in relation to the surroundings, not in relation o the device's or user interface's movement.

In one embodiment the controller 300 is further configured to generate application control data according to the received motion data and thereby control the application according to the detected motions or movements. This provides the feature of controlling an application, in this embodiment a game, by motions while maintaining a horizontal virtual horizon irrespective of the angle of a device incorporating such a user interface.

This would provide a very intuitive and easy to use manner of controlling and perceiving a game, esp. such as a motorcycle or other race car game.

This also allows for maintaining a stable view of a screen image for an application while allowing for movement based control in one and the same user interface or device In one embodiment a level of normal movement is measured over time so that the controller can ascertain what is normal shaking and what is a deliberate control movement. The level of detail used in such a calibration depends on the application settings and user needs. If the average movement is detected to be substantial, a higher threshold value for triggering a deliberate movement will be set. For applications requiring fine tuning and fine control a lower threshold will be set.

In one embodiment movements or motions in a horizontal level are detected. In one embodiment movements or motions in a vertical level are detected. In one embodiment movements or motions in both a horizontal level and a vertical level are detected.

It should be noted that the virtual horizon need not be a visible horizon, it may be an imaginary horizon without any virtual or physical equivalent. It may simply be a perceived horizontal direction. The virtual horizon is determined through determining a virtual horizontal alignment of the screen view to a real world horizon. In other words, the virtual horizontal alignment is an imaginary horizon that is parallel to a real-world horizon.

In one embodiment the virtual horizontal alignment is taken to be horizontal upon startup of an application.

In one embodiment the virtual horizon is determined from the screen view using image processing techniques. In such an embodiment the virtual horizon could be the same as a graphically rendered horizon in the screen view.

It should be noted that the screen view is completely generated by the application it is representing and is not a camera view as a camera view has a real horizon.

It should also be noted that the motion detector is not a camera as such a motion detector would only work when it is not covered.

In one embodiment the size of the application area is larger than the actual screen size so that the application area extends beyond the screen view. This provides a possibility of having objects outside the screen view that will be brought into the screen view as the device is moved and the screen view updated accordingly.

In one embodiment this larger application area is fully rendered, but only partially shown.

In one embodiment the application area comprises more pixels than the screen view.

FIG. 5A shows a flow chart of a basic method according to the teachings herein. In an initial step an image, or a screen view, is displayed (step 501). In a second step 502 a movement is detected and motion data is generated accordingly. In a third step 503 a controller determines a virtual counter movement for the displayed image that will counteract the visual effect of the detected movement and the updated image is displayed in step 504 after having been subjected to the virtual counter movement.

FIG. 5B shows a flow chart of a method according to the teachings herein. In a first step 510 a virtual horizontal alignment for a screen view of an application is determined. The virtual horizontal alignment or virtual horizon can be determined to have the direction as is given upon startup of the represented application. As an alternative a virtual horizon can be determined upon startup of the device.

In a second step 520 a movement is detected by the motion detector which generates motion data representing the detected movement. The motion detector is in this embodiment an accelerometer but the teachings herein is not to be construed as limiting to an accelerometer.

The motion data is received by the controller in a third step 530 and the controller determines which motion the motion data represents in a fourth step 540. It is commonly known how to determine a motion from motion data generated by a motion detector. For example a steady acceleration means a linear movement with increased speed.

In a fifth step 550 the controller adapts or updates the direction of the virtual horizon. The direction of the horizon is updated to counteract the movement of the device. That is the virtual horizon, or rather the displayed screen view, is given the opposite movement of the movement detected. In a sixth step 560 the controller updates the screen view according to the updated virtual horizon or virtual horizontal alignment. And finally, step 570, the updated screen view is displayed on the display to visually counteract the detected movement.

In one embodiment the counteracted movement is gradually reduced or retracted so that after or over a period of time the screen view returns to an angle where the virtual horizon coincides with a device horizon, i.e. the virtual horizon will coincide or be parallel with the bottom of the screen.

In one embodiment the controller is configured to update the screen view according to the detected movement or motion. In one embodiment the controller is further configured to update the screen view in proportion to the detected movement or motion and where said proportion is not a 1:1 relation. For example if the device is moved 10 cm the screen view is moved 1 cm. Alternatively if the device is tilted 10 degrees, the screen view is tilted 5 degrees.

Figure 6A:
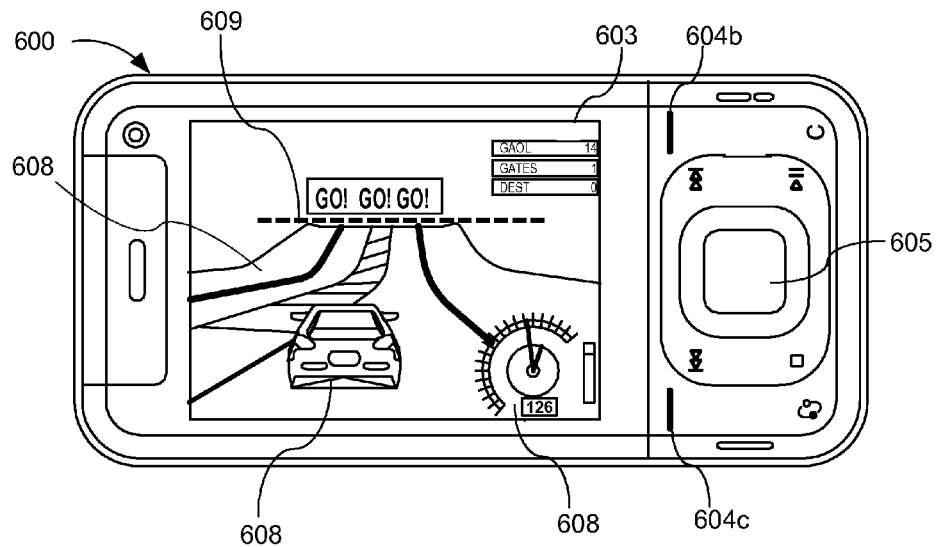

FIG. 6A shows a device 600 according to the teachings herein. The device 600 is, in this exemplary embodiment, a mobile phone such as is described with reference to FIG. 2 and incorporates a user interface being coupled to a display 603.

In FIG. 6A a view of a race car application is displayed on a display 603. As can be seen the screen view has a number of visual objects 608, a car, a road, a bridge, houses and a speedometer, but no visible (virtual) horizon. Although it is clear to a human user that the screen view does have a horizon 609. In the image the virtual horizon 609 is indicated by a dashed line.

Figure 6B:
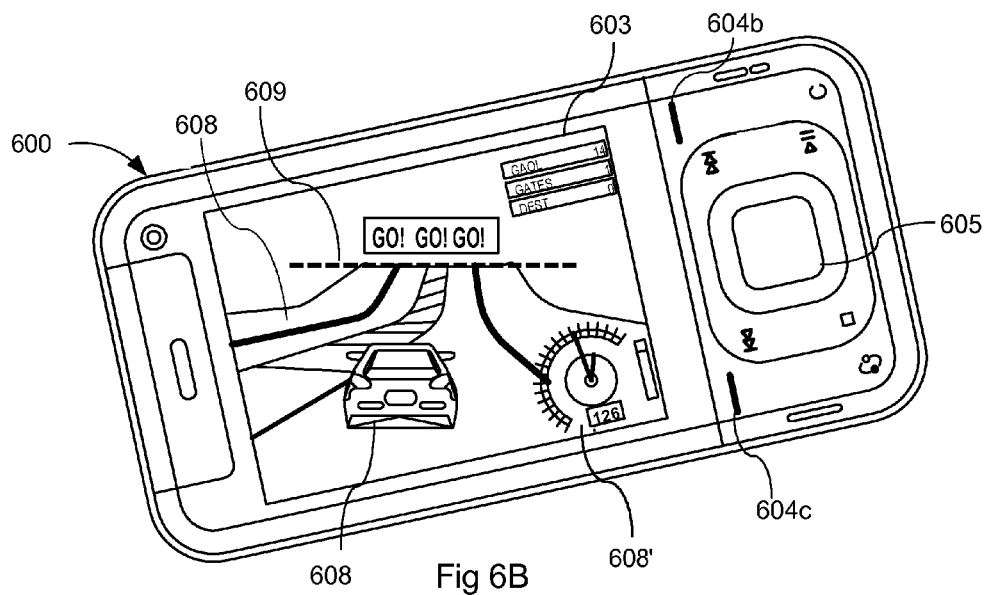

FIG. 6B shows the device 600 as it has been turned an angle which movement has been detected by a motion sensor (207). The motion sensor (207) has generated motion data representing the detected movement which data has been processed by the controller 300. The controller has updated the screen view so as to maintain the virtual horizon 609 parallel with a real-world horizon (not shown). This can be done by measuring a titling angle and rotating the screen view accordingly. A tilting angle of 5 degrees clockwise would be offset by a counter clockwise rotation of the screen view by 5 degrees to visually counteract the detected movement of tilting the device 5 degrees.

In one embodiment, as is displayed in FIG. 6B some graphical objects 608 can be maintained in their positions on the screen 603. In this embodiment the speedometer 608' is kept stationary. This provides a cleaner view that a user can more easily get familiar with in that all control objects are maintained stationary.

Other image processing methods and motion detection methods can also be used to update the screen view according to a detected motion.

One advantage of the teachings herein is that they provide a more engaging experience. Due to that an application is not statically positioned on the display, but rather reacts to the movements of the device, a desirable dynamic and realistic effect may be obtained.

On aspect of the teachings herein is to make a home screen and user interface of a device respond more dynamically and appear more alive.

The various aspects of what is described above can be used alone or in various combinations. The teaching of this application may be implemented by a combination of hardware and software, but can also be implemented in hardware or software. The teaching of this application can also be embodied as computer readable code on a computer readable medium. It should be noted that the teaching of this application is not limited to the use in mobile communication terminals such as mobile phones, but can be equally well applied in Personal digital Assistants (PDAs), game consoles, MP3 players, personal organizers or any other device designed for providing game applications.

The teaching of the present application has numerous advantages. Different embodiments or implementations may yield one or more of the following advantages. It should be noted that this is not an exhaustive list and there may be other advantages which are not described herein. One advantage of the teaching of this application is that a user interface or a device provides a user with an intuitive and easy to learn and use manner of maintaining a stable screen view for an application in a user interface on a device regardless of movements that the device may be subjected to.

Although the teaching of the present application has been described in detail for purpose of illustration, it is understood that such detail is solely for that purpose, and variations can be made therein by those skilled in the art without departing from the scope of the teaching of this application.

For example, although the teaching of the present application has been described in terms of a mobile phone, it should be appreciated that the teachings of the present application may also be applied to other types of electronic devices, such as music players, palmtop computers and the like. It should also be noted that there are many alternative ways of implementing the methods and apparatuses of the teachings of the present application.

The term "comprising" as used in the claims does not exclude other elements or steps. The term "a" or "an" as used in the claims does not exclude a plurality. A unit or other means may fulfill the functions of several units or means recited in the claims.

The invention claimed is:

1. An apparatus comprising a processor and a memory storing computer-readable instructions, wherein the memory and stored computer-readable instructions are configured, with the processor, to cause the apparatus to at least:
    cause display of a screen view representing an application, wherein the screen view comprises a first visual object, a second visual object, and a virtual horizontal alignment in parallel with a reference horizon external to a device;
    receive motion data representing a detected movement of the device comprising a tilting of the device with respect to the reference horizon; and
    update said displayed screen view to visually counteract said detected movement of the device, wherein the update comprises moving the first visual object to counteract the detected movement while the second visual object remains stationary with respect to the screen view.

2. The apparatus according to claim 1, where the memory and the computer program code are further configured, with the processor, to determine said virtual horizontal alignment for said displayed screen view and to update said virtual horizontal alignment according to said detected movement.

3. The apparatus according to claim 1, where the memory and the computer program code are further configured, with the processor, to generate control instructions according to said received motion data and to control said application according to said determined control data.

4. The apparatus according to claim 1, where the memory and the computer program code are further configured, with the processor, to determine said virtual horizontal alignment according to the screen view representing said application upon startup of said application.

5. The apparatus according to claim 1, where the memory and the computer program code are further configured, with the processor, to determine said virtual horizontal alignment according to graphical objects in said screen view using image processing methods.

6. The apparatus of claim 1, wherein the first visual object moves in a direction opposite of the detected movement.

7. The apparatus of claim 1, wherein moving the first visual object to counteract the detected movement comprises moving the first visual object to maintain its relation with the virtual horizontal alignment.

8. The apparatus of claim 1, wherein the counteraction to the detected movement is in proportion to the detected movement.

9. The apparatus of claim 1, wherein the reference horizon is a real-world horizon.

10. The apparatus of claim 1, wherein the application is a gaming application.

11. A method comprising:
   causing display of a screen view representing an application, wherein the screen view comprises a first visual object, and a second visual object, and a virtual horizontal alignment in parallel with a reference horizon external to a device;
   receiving motion data representing a detected movement of the device comprising a tilting of the device with respect to the reference horizon; and
   updating said displayed screen view to visually counteract said detected movement of at least the device, wherein updating comprises moving the first visual object to counteract the detected movement while the second visual object remains stationary with respect to the screen view.

12. A method according to claim 11, further comprising generating control data according to said received motion data and to control said application according to said control data.

13. The method according to claim 11, further comprising determining said virtual horizontal alignment for said displayed screen view and updating said virtual horizontal alignment according to said detected movement.

14. A method according to claim 11, further comprising determining said virtual horizontal alignment according to the screen view representing said application upon startup of said application.

15. The method according to claim 11, further comprising determining said virtual horizontal alignment according to graphical objects in said screen view using image processing methods.

16. A computer program product comprising at least one non-transitory computer-readable storage medium having computer-executable program code instructions stored therein, the computer-executable program code instructions comprising program code instructions to:
   cause display of a screen view representing an application, wherein the screen view comprises a first visual object, and a second visual object, and a virtual horizontal alignment in parallel with a reference horizon external to a device;
   receive motion data representing a detected movement of the device comprising a tilting of the device with respect to the reference horizon; and
   update said displayed screen view to visually counteract said detected movement of at least the device, wherein the update comprises moving the first visual object to counteract the detected movement while the second visual object remains stationary with respect to the screen view.

17. A computer program product according to claim 16 wherein the computer-executable program code instructions comprise program code instructions to determine said virtual horizontal alignment for said displayed screen view and to update said virtual horizontal alignment according to said detected movement.

18. A computer program product according to claim 16 wherein the computer-executable program code instructions comprise program code instructions to generate control instructions according to said received motion data and to control said application according to said determined control data.

19. A computer program product according to claim 16 wherein the computer-executable program code instructions comprise program code instructions to determine said virtual horizontal alignment according to the screen view representing said application upon startup of said application.

20. A computer program product according to claim 16 wherein the computer-executable program code instructions comprise program code instructions to determine said virtual horizontal alignment according to graphical objects in said screen view using image processing methods.

* * * * *